(12) United States Patent
Morgan et al.

(10) Patent No.: US 12,177,230 B2
(45) Date of Patent: *Dec. 24, 2024

(54) FRAUDULENT HOST DEVICE CONNECTION DETECTION

(71) Applicant: ConnectWise, LLC, Tampa, FL (US)

(72) Inventors: Jacob Morgan, Raleigh, NC (US); Benjamin Burner, Raleigh, NC (US)

(73) Assignee: ConnectWise, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,678

(22) Filed: Sep. 20, 2023

(65) Prior Publication Data
US 2024/0031375 A1 Jan. 25, 2024

Related U.S. Application Data

(63) Continuation of application No. 17/687,280, filed on Mar. 4, 2022, now Pat. No. 11,792,208, which is a continuation of application No. 16/372,769, filed on Apr. 2, 2019, now Pat. No. 11,283,813.

(51) Int. Cl.
*H04L 9/40* (2022.01)
*G06F 21/55* (2013.01)

(52) U.S. Cl.
CPC .......... *H04L 63/126* (2013.01); *G06F 21/552* (2013.01); *G06F 21/554* (2013.01); *H04L 63/102* (2013.01); *G06F 2221/034* (2013.01)

(58) Field of Classification Search
CPC ... H04L 63/126; H04L 63/102; G06F 21/552; G06F 21/554; G06F 2221/034

USPC .......................................................... 726/4
See application file for complete search history.

(56) References Cited

U.S. PATENT DOCUMENTS

| | | | |
|---|---|---|---|
| 6,714,918 B2 | 3/2004 | Hillmer et al. | |
| 7,774,842 B2 | 8/2010 | Mahone et al. | |
| 8,458,486 B2 * | 6/2013 | Terris | H04L 63/083 713/184 |
| 8,528,084 B1 | 9/2013 | Dingle et al. | |
| 8,554,912 B1 | 10/2013 | Reeves et al. | |

(Continued)

OTHER PUBLICATIONS

Final Office Action on U.S. Appl. No. 16/372,769 DTD Aug. 3, 2021.

(Continued)

*Primary Examiner* — Amare F Tabor
(74) *Attorney, Agent, or Firm* — Foley Hoag LLP; John Lanza; Joshua S. Matloff

(57) ABSTRACT

Systems and methods of managing fraudulent devices are provided. The system detects a request for a connection to communicatively couple a technician computing device with a receiver computing device. The system identifies connection data for the connection. The system requests, based on the connection data, a plurality of account values. Each of the plurality of account values is associated with an account that the technician computing device used to establish the connection. The system generates a score indicating a fraudulent level of the account based on the plurality of account values. The system terminates, responsive to a comparison of the score with a fraud threshold, the connection. The system transmits, to a ticketing system, a support ticket generated responsive to the comparison of the score with the fraud threshold.

20 Claims, 6 Drawing Sheets

(56) References Cited

U.S. PATENT DOCUMENTS

| | | | |
|---|---|---|---|
| 8,661,538 B2 | 2/2014 | Cohen-Ganor et al. | |
| 8,676,684 B2 * | 3/2014 | Newman | G06Q 40/02 |
| | | | 705/35 |
| 8,739,278 B2 | 5/2014 | Varghese | |
| 10,015,171 B1 | 7/2018 | Vardy et al. | |
| 10,284,590 B2 | 5/2019 | Ramos De Araujo et al. | |
| 10,715,544 B2 | 7/2020 | Gould et al. | |
| 10,749,892 B2 | 8/2020 | Araujo et al. | |
| 10,834,104 B1 | 11/2020 | Comeaux et al. | |
| 10,880,436 B2 * | 12/2020 | Jackson | H04M 3/5183 |
| 11,283,813 B2 * | 3/2022 | Morgan | H04L 63/102 |
| 11,605,085 B2 * | 3/2023 | Liu | G06F 17/11 |
| 2012/0204257 A1 | 8/2012 | O'Connell et al. | |
| 2013/0339186 A1 | 12/2013 | French et al. | |
| 2014/0150097 A1 | 5/2014 | Carvalho | |
| 2014/0208424 A1 | 7/2014 | Hudack et al. | |
| 2015/0213246 A1 | 7/2015 | Turgeman et al. | |
| 2017/0085587 A1 | 3/2017 | Turgeman | |
| 2017/0111364 A1 | 4/2017 | Rawat | |
| 2018/0218369 A1 * | 8/2018 | Xiao | G06Q 20/4016 |
| 2019/0182673 A1 | 6/2019 | Hilbuch et al. | |
| 2020/0145436 A1 | 5/2020 | Brown et al. | |
| 2020/0226401 A1 | 7/2020 | Rajagopal et al. | |
| 2020/0356898 A1 | 11/2020 | Claussen et al. | |
| 2021/0374764 A1 * | 12/2021 | Kramme | G06Q 20/409 |

OTHER PUBLICATIONS

Non-Final Office Action on U.S. Appl. No. 17/687,280 DTD Dec. 22, 2022.

Notice of Allowance on U.S. Appl. No. 17/687,280 DTD Jun. 13, 2023.

US Notice of Allowance on U.S. Appl. No. 16/372,769, dated Nov. 15, 2021.

US Office Action on U.S. Appl. No. 16/372,769 DTD Feb. 3, 2021.

* cited by examiner

FRAUDULENT HOST DEVICE CONNECTION DETECTION

CROSS-REFERENCE TO RELATED APPLICATIONS

The present disclosure is a continuation of U.S. patent application Ser. No. 17/687,280, filed Mar. 4, 2022 entitled "FRAUDULENT HOST DEVICE CONNECTION DETECTION" which is a continuation of and claims priority to U.S. patent application Ser. No. 16/372,769, filed Apr. 2, 2019, and entitled "FRAUDULENT HOST DEVICE CONNECTION DETECTION," the contents of which is hereby incorporated by reference in its entirety for all purposes.

FIELD OF THE DISCLOSURE

The present disclosure generally relates to providing remote access in information technology infrastructure. In particular, systems and methods of the present disclosure can detect fraudulent computing devices in the information technology infrastructure.

BACKGROUND OF THE DISCLOSURE

Information technology infrastructure can include computing devices, networking devices, peripherals, accessories, or other devices that are connected to the network. Devices can malfunction or fail from time-to-time. However, due to the large number of devices, their remote location, the various types of devices, it can be challenging to actively monitor and manage the devices to efficiently remedy or address a fraudulent device.

SUMMARY OF THE DISCLOSURE

Systems and methods of this disclosure are directed to providing remote access in information technology infrastructure. In particular, systems and methods of this disclosure can provide a control system to detect a fraudulent device in the information technology infrastructure. Upon detecting such a fraudulent device, the control system can terminate the connection between the fraudulent device and one or more computing devices.

At least one aspect is directed to a method of managing fraudulent devices. The method can include detecting, by a control system comprising a processor and memory that is intermediary to one or more computing devices and one or more servers that provide a plurality of cloud services, a request for a connection to communicatively couple a technician computing device with a receiver computing device. The method can include identifying, by the control asystem via a data stream, connection data for the connection. The method can include requesting, by the control system based on the connection data, a plurality of account values. Each of the plurality of account values is associated with an account that the technician computing device used to establish the connection. The method can include generating, by the control system, a score indicating a fraudulent level of the account based on the plurality of account values. The method can include terminating, responsive to a comparison of the score with a fraud threshold, the connection. The method can include transmitting, by the control system to a ticketing system, a support ticket generated responsive to the comparison of the score with the fraud threshold.

In some embodiments, the method can further include identifying, by the control system, network traffic that comprises a domain name service request from the technician computing device to determine that the connection is established.

The connection data can include at least one of: an IP address of technician computing device logging into the account, an IP address during creation of the account, a first timestamp when the technician computing device logs into the account, and a second timestamp when the technician computing device creates the account.

The method can further include generating, by the control system, the score indicating the fraudulent level of the account based on at least one of the first timestamp or the second timestamp.

The connection data can further include an identifier of a particular cloud service of the plurality of cloud services, the particular cloud service being an instance of software executing on the one or more servers.

The plurality of account values can include billing information associated with the technician computing device. The method can further include generating, by the control system using a matrix having a plurality of individual scores indicating a respective fraudulent level of the account, the score indicating the fraudulent level of the account based on the billing information associated with the account.

The plurality of account values can include a geographic location of the technician computing device. The method can further include generating, by the control system using a matrix having a plurality of individual scores indicating a respective fraudulent level of the account, the score indicating the fraudulent level of the account based on the geographic location of the technician computing device.

The plurality of account values can include a plurality of session types associated with the technician computing device. Each of the plurality of session types is configured to allow the technician computing device to use the account to establish a session to respective one of the plurality of cloud services via the connection.

The method can further include generating, by the control system using a matrix having a plurality of individual scores indicating a respective fraudulent level of the account, the score indicating the fraudulent level of the account based on determining that a number of sessions in each session type exceeds a predefined number threshold.

The method can further include generating, by the control system using a matrix having a plurality of individual scores indicating a respective fraudulent level of the account, the score indicating the fraudulent level of the account based on detecting that a graphical user interface and/or a name of at least one of the plurality of cloud services has been modified.

At least one aspect is directed to a system to manage fraudulent devices. The system includes a control system, intermediary to one or more computing devices and one or more servers that provide a plurality of cloud services, and comprising one or more processors and memory. The control system can detect a request for a connection to communicatively couple a technician computing device with a receiver computing device. The control system can identify, via a data stream, connection data for the connection. The control system can request, based on the connection data, a plurality of account values, each of the plurality of account values associated with an account that the technician computing device used to establish the connection. The control system can generate a score indicating a fraudulent level of the account based on the plurality of account values. The control system can terminate, responsive to a comparison of the score with a fraud threshold, the connection. The control system can transmit a support ticket a ticketing system that is generated responsive to the comparison of the score with the fraud threshold.

In some embodiments, the control system can further identify network traffic that comprises a domain name service request from the technician computing device to determine that the connection is established.

The connection data can include at least one of: an IP address of technician computing device logging into the account, an IP address during creation of the account, a first timestamp when the technician computing device logs into the account, and a second timestamp when the technician computing device creates the account.

The control system can further generate the score indicating the fraudulent level of the account based on at least one of the first timestamp or the second timestamp.

Connection data can further include an identifier of a particular cloud service of the plurality of cloud services, the particular cloud service being an instance of software executing on the one or more servers.

The plurality of account values can include billing information associated with the technician computing device. The control system can further use a matrix having a plurality of individual scores indicating a respective fraudulent level of the account to generate the score indicating the fraudulent level of the account based on the billing information associated with the account.

The plurality of account values can include a geographic location of the technician computing device. The control system can further use a matrix having a plurality of individual scores indicating a respective fraudulent level of the account to generate the score indicating the fraudulent level of the account based on the geographic location of the technician computing device.

The plurality of account values can include a plurality of session types associated with the technician computing device. Each of the plurality of session types is configured to allow the technician computing device to use the account to establish a session to respective one of the plurality of cloud services via the connection.

The control system can further use a matrix having a plurality of individual scores indicating a respective fraudulent level of the account to generate the score indicating the fraudulent level of the account based on determining that a number of sessions in each session type exceeds a predefined number threshold.

The control system can further use a matrix having a plurality of individual scores indicating a respective fraudulent level of the account to generate the score indicating the fraudulent level of the account based on detecting that a graphical user interface and/or a name of at least one of the plurality of cloud services has been modified.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION OF THE DISCLOSURE

Figure 1:
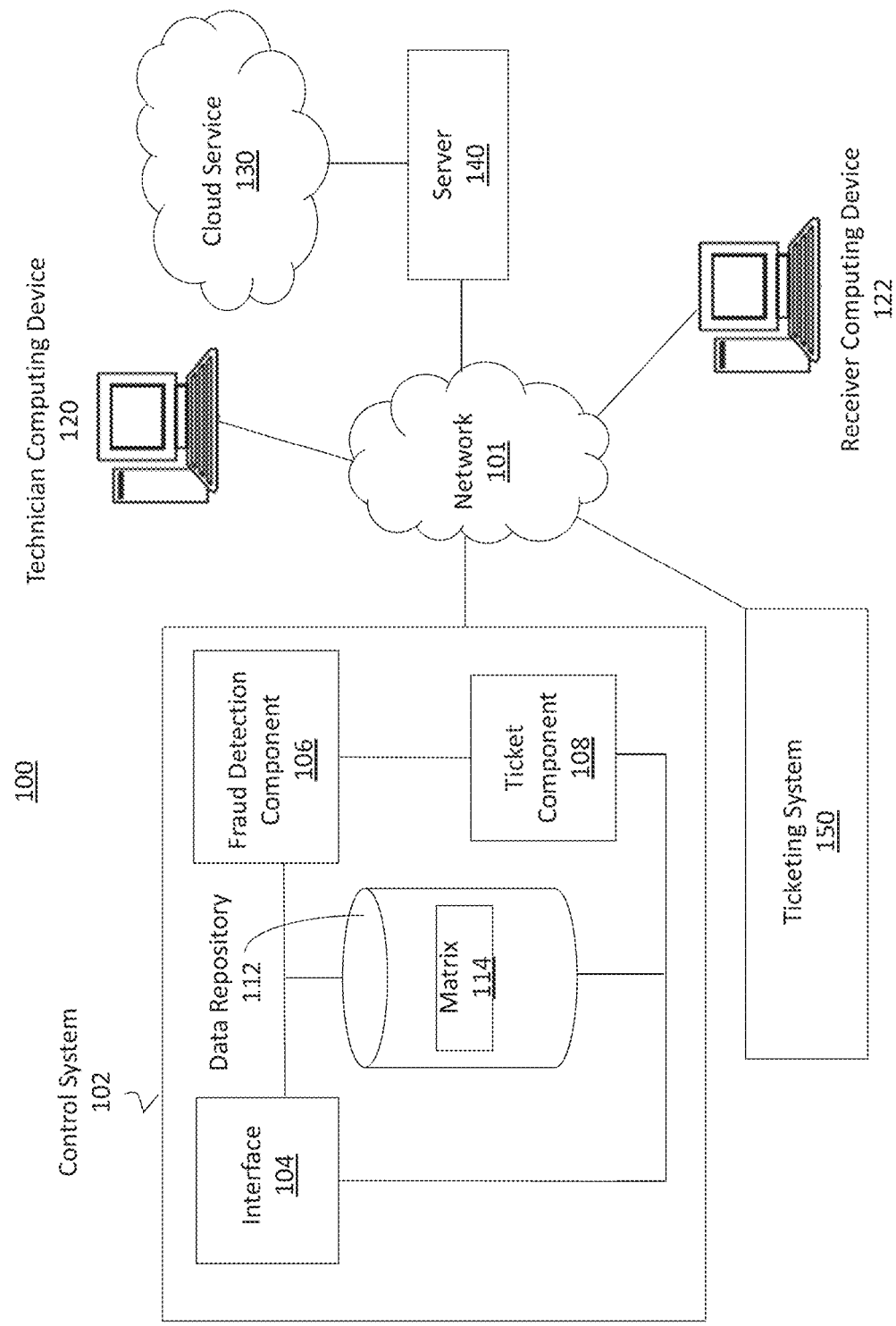
FIG. 1 is an illustrative block diagram of an example embodiment of a system for detecting fraudulent devices in information technology infrastructure.

A cloud service can provide a service or resource over a network, such as the Internet. Cloud services can include Software as a Service ("SaaS"), Platform as a Service ("PaaS"), or Infrastructure as a Service ("IaaS"). SaaS can include a software distribution model in which an application can be hosted by a vendor or service provider and made available to customers over the network. PaaS can include the delivery of an operating system and associated services of the network without downloading or installing the operating system. IaaS can include outsourcing equipment used to support operations, including storage, hardware, servers and network components, which can be access over the network.

Due to limited hardware resources, network resources, or other computing related resources, companies can outsource their information technology ("IT") services to outside IT service providers. IT service providers can use software tools to provide IT support by facilitating the monitoring, service, and configuration of computing devices of their customers.

A web application (e.g., a self-hosted remote desktop software application) can provide a platform or interface executing as a cloud service between a receiver computing device and one or more IT service providers. The receiver computing device can resort to the web application by generating a request upon determining that the client computing device needs modification on its configuration. Upon detecting the request, the web application can route, forward, or otherwise provide the request to one of the IT service providers to allow a technician computing device of the IT service provider to remotely modify the configuration of the receiver computing device. In some instances, a technician computing device, for example, can use a fraudulent account to the web application claiming to offer a legitimate technical support service to a receiver computing device. Such a technical computing device may sometimes be referred to as a scammer computing device or a fraudulent computing device. Once connected to the receiver computing device, the fraudulent computing device can do things that can negatively harm the receiver computing device, or a user of the receiver computing device (e.g., exposing private information of the user, misusing the receiver computing device for other purposes not authorized by the user, installing malware, etc.). Thus, a fraudulent computing device that goes undetected can waste computing resources (e.g., excess network bandwidth utilization, server utilization, end user computing device processor and memory utilization), or introduce bugs or errors into the end user computing device. Further, as a web application scales up, an increasing number of undetected or blocked fraudulent computing devices can cause a computing bottleneck on the system and introduce computing or network latency and delays for legitimate technician support devices.

The systems and methods of this disclosure provide a technical solution to detect such fraudulent computing devices. The described technical solution provides a control system communicatively coupled to a number of technician computing devices and one or more servers that provide a cloud service to route network traffic between the technician computing devices and receiver computing devices. The control system can identify the connection data regarding a connection that a technician computing device makes to communicatively couple to the server. Based on the connection data, the control system can request various information regarding an account that the technician computing device uses to access the server. The control system can generate a score indicating a fraudulent level of the account and terminate the connection in response to determining that the score satisfies a fraudulent threshold. As such, the control system can prevent the fraudulent computing device from causing any harm to the receiver computing device. The control system can proactively prevent the fraudulent computing device from causing harm to the receive computing device by blocking or terminating the connection before the fraudulent computing device causes such harm. The control system can (e.g., prior to commands sent from fraudulent computing device subsequent connection or request to establish connection; within 20 seconds of the connection or connection request; within 10 seconds of connection or connection request; or within 5 seconds or less of the connection or connection request) prevent the fraudulent computing device from causing harm.

Referring now to FIG. 1, a block diagram of a system 100 for managing fraudulent devices to detect a fraudulent computing device of information technology infrastructure is shown. In brief overview, the system 100 can include a control system 102. The system 100 can include, access or interact with one or more of a technician computing device 120 and a receiver computing device 122. The system 100 can include, access or interact with one or more cloud services 130 through one or more of a server 140. The system 100 can include, access or interact with a ticketing system 150. The components or functions of the system 100 (e.g., 102, 120, 122, 130, 140, and 150) can communicate with one another via one or more networks 101. The system 100 can include one or more component or function as depicted in FIGS. 3A-3D.

The control system 102 can be executed by one or more servers (e.g., server 306a) or a cloud 308 or on one or more processors (e.g., main processor 321). The control system 102 can include an interface 104 designed and constructed to communicate with one or more of the technician computing device 120, the receiver computing device 122, the server 140, and the ticketing system 150. The interface 104 can include a port, networking protocol, or application programming interface. The interface 104 can include or provide a graphical user interface.

The technician computing device 120 can include, for example, a desktop, laptop, tablet computing, smartwatch, wearable device, augmented reality device, or virtual reality device. The technician computing device 120 can include a telecommunications device. The technician computing device 120 can include input devices such as a keyboard, touchpad, mouse, pointing device, joystick or voice input interface. The technician computing device 120 can include a virtual machine that is executed on a server, or a virtual machine executed in a cloud service or cloud computing environment.

The receiver computing device 122 can include, for example, a desktop, laptop, tablet computing, smartwatch, wearable device, augmented reality device, or virtual reality device. The receiver computing device 122 can include a telecommunications device. The receiver computing device 122 can include input devices such as a keyboard, touchpad, mouse, pointing device, joystick or voice input interface. The receiver computing device 122 can include a virtual machine that is executed on a server, or a virtual machine executed in a cloud service or cloud computing environment.

The receiver computing device 122 can be local to an entity, organization, office or location that includes information technology infrastructure that is receive support from an agent or support technician that uses the technician computing device 120. The technician computing device 120 can use a support ticket, routed by the cloud service 130, to access the cloud service 130 and use the cloud service 130 to access the receiver computing device 122.

The ticketing system 150 can include, interface with or otherwise communicate with a database to retrieve a list of support tickets. A support ticket can refer to a ticket data structure that includes information that can facilitate resolving a technical problem associated with hardware or software component at a location of the receiver computing device 122. Each support ticket can have an identifier and an association to a computing device.

The control system 102 can include, interface with or otherwise communicate with at least one interface 104, at least one fraud detection component 106, at least one ticket component 108, and at least one data repository 112. The data repository 112 can include one or more data structures, data bases, or data files, such as a matrix 114.

The interface 104, fraud detection component 106, or ticket component 108 can each include at least one processing unit or other logic device such as programmable logic array engine, or module configured to communicate with the database repository 112. The interface 104, fraud detection component 106, ticket component 108, and data repository 112 can be separate components, a single component, or part of the control system 102. The system 100 and its components, such as a control system 102, can include hardware elements, such as one or more processors, logic devices, or circuits.

The interface 104 can include any type of interface configured to facilitate communication between one or more component, system or device of system 100. The interface 104 can be configured to facilitate communication or interaction between components or elements of the control system 102. The interface 104 can present, display or otherwise provide a graphical user interface or other user interface to facilitate user interaction with the system 102.

The interface 104 can include, communicate with or execute one or more application programming interfaces ("APIs"). The APIs can be configured to interact or interface with a technician computing device 120 or a receiver computing device 122. The interface 104 can include or utilize one or more cloud application programming interfaces. The interface can include or be based on, for example, a cloud API, Open Cloud Computing Interface ("OCCI"), or representation state transfer ("REST"). Responses and requests can be received or transmitted via the interface 104 using one or more protocol or language, such as, e.g., XML, HTML, JSON, HTTP, or SSL. Responses and requests can be received or transmitted via the host client interface 104 using one or more protocol or language, such as, e.g., XML, HTML, JSON, HTTP, or SSL.

The control system 102 can be intermediary to the technician computing device 120 and the server 140. The control system 102 can be intermediary to the receiver computing device 122 and the server 140. In some cases, the technician computing device 120 can interact with the receiver computing device 122 directly. In some cases, the technician computing device 120 can interact with the receiver computing device 122 through the server 140 that executes the cloud service 130. For example, the technician computing device 120 can access, use, or otherwise interact with the cloud service 130 to interact with the receiver computing device 122.

The fraud detection component 106 can utilize the interface 104 to detect, pinpoint, or otherwise identify a request for a connection to communicatively couple the technician computing device 120 with the receiver computing device 122. In some embodiments, the fraud detection component 106 can identify network traffic over the network 101 with a domain name service (DNS) request originated from or established by the technician computing device 120 to determine that the technician computing device 120 has made a request to connect to the receiver computing device 122, or a connection between the technician computing device 120 and receiver computing device 122 has been established. The technician computing device 120 can send such a DNS request, which can include a query for a domain name, through a number of intermediary servers (e.g., a recursive resolver, a root server, etc.) to the server 140 for using the cloud service 130 to access the receiver computing device 122. Responsive to receiving the request, the server 140 can respond to the technician computing device 120 through at least one of the intermediary servers with an IP address matching the domain name in the query. The fraud detection component 106 can identify the network traffic during any point of the above-described communication between the technician computing device 120 and server 140, which is sometimes referred to as DNS resolution.

In response to identifying a request for a connection or an established connection, the fraud detection component 106 can utilize the interface 104 to extract, determine, or otherwise identify connection data for the connection via a data stream. The data stream can be part of network traffic transmitting to or receiving from the technician computing device 120. The data stream can refer to a sequence of digitally encoded coherent signals, or packets of data or data packets used to transmit or receive information that is in the process of being transmitted. The data packets can include a header and a payload containing data. The fraud detection component 106 can parse or process the header or payload information associated with data packets of the data stream to detect fraudulent or malicious computing devices or connection requests. The fraud detection component 106 can identify connection data of the connection from the data stream. For example, the fraud detection component 106 can identify the connection data, which can be at least one of: an IP address where the technician computing device 120 logged into an account to the cloud service 130, an IP address where the technician computing device created the account to the cloud service 130, a timestamp (T1) when the technician computing device 120 logged into the account to the cloud service 130, and a timestamp (T2) when the technician computing device 120 created the account to the cloud service 130. In some embodiments, such timestamps can be used by the fraud detection component 106 to detect a fraudulent computing device.

In another example, the fraud detection component 106 can identify the connection data, which can be an identifier of one of the one or more cloud services 130. In some embodiments, the one or more cloud services 130 can be each implemented as a respective virtual server, virtual environment, or virtual machine on the server 140. As such, each of the cloud services can be an instance of a program or software executing on the server 140. Each of the instances of software can be associated with a respective identifier. The fraud detection component 106 can identify such an identifier of the cloud service via the data stream transmitting to or receiving from the technician computing device 120. For example, the technician computing device 120 can initiated a request over the network 101 to connect to a particular cloud service of the one or more cloud services 1030 using an account to the particular cloud service. The fraud detection component 106 can intercept a data stream over the network 101 to identify that particular cloud service through its corresponding identifier.

Based on the identified connection data, the fraud detection component 106 can communicate with one or more endpoints to request, retrieve, or obtain a number of account values or indicators. Each of the account values is associated with the account that the technician computing device 120 used to establish the connection. Examples of the endpoints can include an administrative account of the one or more cloud services 130, a particular cloud service that the technician computing device 120 intended to use, and a publicly facing user interface of the one or more cloud services 130. By communicating with such endpoints using the identified connection data, the fraud detection component 106 can obtain a number of accounts values associated with an account used by the technician computing device 120 or the receiver computing device 122, which can include one or more of the following: billing information associated with the technician computing device 120 or the receiver computing device 122, geographic locations of the technician computing device 120 and/or receiver computing device 122, types of the sessions to the one or more cloud services 130 that the technician computing device 120 or the receiver computing device 122 intended to establish, and a number threshold of each session type that the technician computing device 120 or the receiver computing device 122 intended to establish. In some implementations, the fraud detection component 106 may interface with the endpoints to parse, ingest, or otherwise process one or more electronic activities (e.g., an email, a phone call, a test message, an instant message (across various platforms), and so forth) to obtain the account values.

In some embodiments, the fraud detection component 106 can generate, build, or otherwise provide the matrix 114 using the account values. The fraud detection component 106 can assign each of the account values an individual score to indicate a fraudulent level of the corresponding account value based on a data structure (e.g., a list, a table, a bitmap) managed by one or more of the endpoints, for instance, the administrative account of the one or more cloud services 130. The individual score can be estimated to range from 0 to 1, where 1 indicates the highest fraudulent level and 0 indicates the lowest fraudulent level. The fraud detection component 106 can collect respective individual scores of the account values across all the computing devices connected through the network 101 (e.g., 120, 122) over the time. As such, the fraud detection component 106 can generate a multi-dimensional matrix with a number of rows, representing the computing devices (or the accounts used by the computing devices) at a time, and a number of columns, representing the individual scores of the account values. The fraud detection component 106 can adopt new rows and/or columns over the time and use one or more of a machine learning techniques (e.g., a supervised learning algorithm) to analyze, weight, or otherwise train the matrix over the time. The fraud detection component 106 can generate an individual score for each of the adopted account values based on a classifier (e.g., a decision tree, a Bernoulli Naive Bayes Classifier, etc.), a logistic regression model, and/or any other regression model that can take the adopted account values (e.g., obtained from one or more electronic activities) as inputs of the matrix. Thus, the fraud detection component 106 can capture any new account value identified by one or more of the endpoints and any new computing device that intends to connect to the cloud service 130 to accurately estimate respective individual scores.

For example, the fraud detection component 106 can provide the matrix 114 by building up a matrix "X," with "N" rows and "M" columns. Each of the M columns can represent respective individual scores for each of the account values over N trained events; and each of the N rows can represent a vector with M individual scores that respectively correspond to the account values. The "trained event" as used herein can refer to an event in which the individual scores of the account values associated with a technician computing device have been calculated or estimated by a supervised learning algorithm and/or by communicating with one or more of the above-described endpoints. As such, each of the N rows can include M of 1's and 0's, wherein 1 represents the individual score of an account value being identified as fraud and 0 represents the individual score of an account value not being identified as fraud. Upon the build-up of a certain number of trained events (e.g., a threshold or predetermined number of rows such as 5, 10, 15, 20, 25, 50, 75, 100, 200, or more)), the fraud detection component 106 may determine whether each of the individual scores of the account values, for a computing device, is 1 or 0 using a Bernoulli Naive Bayes Classifier.

Responsive to obtaining the billing information associated the technician computing device 120 (as one of the account values), the fraud detection component 106 can use the matrix to generate a score indicating the fraudulent level of an account used by the technician computing device 120 based on the account value. The technician computing device 120 can use the account to connect to the cloud service 130. In some embodiments, the billing information can be an account identifier associated with the technician computing device 120. In response to obtaining the account identifier, the fraud detection component 106 can compare the account identifier with a list of fraudulent or hoax account identifiers that are previously identified and dynamically managed by at least one of the endpoints. By communicating with at least one of the endpoints, if there is a match, the fraud detection component 106 can assign an individual score to be substantially close to 1 for the technician computing device 120 (and/or the account the technician computing device 120 used) and for this particular account value. On the other hand, if there is no match, the fraud detection component 106 can assign an individual score to be substantially close to 0 for the technician computing device 120 (and/or the account the technician computing device 120 used) and for this particular account value. The fraud detection component 106 can insert, update, or otherwise provide the individual score to a corresponding position of the matrix 114 (e.g., an intersection of the technician computing device 120 and billing information). In this way, accuracy of the matrix 114 can be dynamically and continuously improved by a supervised learning algorithm over the time. In some embodiments, the fraud detection component 106 may directly use the matrix (e.g., the individual score(s)) to generate a score indicating the fraudulent level of an account used by the technician computing device 120. In some embodiments, the fraud detection component 106 can use such an individual score or combine the individual scores that correspond to other account values of the matrix to generate the score for the technician computing device 120 (and/or the account it used). In some other example, in response to obtaining any account identifier associated the technician computing device 120 (as one of the account values), the fraud detection component 106 can assign an individual score to be substantially close to 1 for the technician computing device 120 (and/or the account the technician computing device 120 used), as in some embodiments, the fraud detection component 106 can assume the technician computing device 120 shall not be involved in any sort of financial situation.

Responsive to obtaining the geographic locations of the technician computing device 120 (as one of the account values), the fraud detection component 106 can use the matrix to generate a score indicating the fraudulent level of an account used by the technician computing device 120 based on the account value. The technician computing device 120 can use the account to connect to the cloud service 130. In response to obtaining a geographic location of the technician computing device 120, the fraud detection component 106 can compare the location with a list of locations of the technician computing device 120 previously identified and dynamically managed by at least one of the endpoints. By communicating with at least one of the endpoints, if there is a match, the fraud detection component 106 can assign an individual score to be substantially close to 0 for the technician computing device 120 (and/or the account the technician computing device 120 used) and for this particular account value. On the other hand, if there is no match, the fraud detection component 106 can assign an individual score to be substantially close to 1 for the technician computing device 120 (and/or the account the technician computing device 120 used) and this particular account value. The fraud detection component 106 can insert, update, or otherwise provide the individual score to a corresponding position of the matrix (e.g., an intersection of the technician computing device 120 and geographic location of the technician computing device 120). In this way, accuracy of the matrix 114 can be dynamically and continuously improved by a supervised learning algorithm over the time. In some embodiments, the fraud detection component 106 may directly use the matrix (e.g., the individual score(s)) to generate a score indicating the fraudulent level of an account used by the technician computing device 120. In some embodiments, the fraud detection component 106 can use such an individual score or combine the individual scores that correspond to other account values of the matrix to generate the score for the technician computing device 120 (and/or the account it used).

Responsive to obtaining the session types to the one or more cloud services 130 that the technician computing device 120 intended to establish (as one of the account values), the fraud detection component 106 can use the matrix to generate a score indicating the fraudulent level of an account used by the technician computing device 120 based on the account value. In some embodiments, the technician computing device 120 can use the account to establish a session to the cloud service 130 via a connection. In response to obtaining a session that the technician computing device 120 intended to establish, the fraud detection component 106 can determine a type of the session (e.g., a meeting type, a support type, an access type, etc.). The fraud detection component 106 can compare the session type with a list of session types that are previously assigned for the technician computing device 120. The endpoints can dynamically manage such a list. By communicating with at least one of the endpoints, if there is a match, the fraud detection component 106 can assign an individual score to be substantially close to 0 for the technician computing device 120 (and/or the account the technician computing device 120 used) and for this particular account value. On the other hand, if there is no match, the fraud detection component 106 can assign an individual score to be substantially close to 1 for the technician computing device 120 (and/or the account the technician computing device 120 used) and for this particular account value. The fraud detection component 106 can insert, update, or otherwise provide the individual score to a corresponding position of the matrix (e.g., an intersection of the technician computing device 120 and session type). In this way, accuracy of the matrix 114 can be dynamically and continuously improved by a supervised learning algorithm over the time. In some embodiments, the fraud detection component 106 may directly use the matrix (e.g., the individual score(s)) to generate a score indicating the fraudulent level of an account used by the technician computing device 120. In some embodiments, the fraud detection component 106 can use such an individual score or combine the individual scores that correspond to other account values of the matrix to generate the score for the technician computing device 120 (and/or the account it used).

In response to determining a session type that the technician computing device 120 intended to establish, the fraud detection component 106 can further obtain a number of sessions within the type that the technician computing device 120 intended to establish (as one of the account values). The endpoints can dynamically manage a number threshold permitted for the technician computing device 120 in each of the sessions types. The fraud detection component 106 can compare the session type with a corresponding number threshold. By communicating with at least one of the endpoints, if the number of sessions (the account value obtained by the fraud detection component 106) exceeds the number threshold, the fraud detection component 106 can assign an individual score to be substantially close to 1 for the technician computing device 120 (and/or the account the technician computing device 120 used) and for this particular account value. On the other hand, if the number of sessions (the account value obtained by the fraud detection component 106) does not exceed the number threshold, the fraud detection component 106 can assign an individual score to be substantially close to 0 for the technician computing device 120 (and/or the account the technician computing device 120 used) and for this particular account value. The fraud detection component 106 can insert, update, or otherwise provide the individual score to a corresponding position of the matrix (e.g., an intersection of the technician computing device 120 and the number of sessions of a particular session type). In this way, accuracy of the matrix 114 can be dynamically and continuously improved by a supervised learning algorithm over the time. In some embodiments, the fraud detection component 106 may directly use the matrix (e.g., the individual score(s)) to generate a score indicating the fraudulent level of an account used by the technician computing device 120. The fraud detection component 106 can use such an individual score or combine the individual scores that correspond to other account values of the matrix to generate the score for the technician computing device 120 (and/or the account it used).

In response to detecting that a graphical user interface and/or a name of one or more cloud services 130 has been modified (as one of the account values), the fraud detection component 106 can use the matrix to generate a score indicating the fraudulent level of an account used by the technician computing device 120 based on the account value. In some embodiments, the technician computing device 120 can use the account to change a graphical user interface and/or a name of the cloud service 130 via a connection. In response to detecting a change, the fraud detection component 106 can compare the new interface or name with a list of interfaces and names that were previously approved and dynamically managed by at least one of the endpoints. By communicating with at least one of the endpoints, if there is a match, the fraud detection component 106 can assign an individual score to be substantially close to 0 for the technician computing device 120 (and/or the account the technician computing device 120 used) and for this particular account value. On the other hand, if there is no match, the fraud detection component 106 can assign an individual score to be substantially close to 1 for the technician computing device 120 (and/or the account the technician computing device 120 used) and this particular account value. The fraud detection component 106 can insert, update, or otherwise provide the individual score to a corresponding position of the matrix. In this way, accuracy of the matrix 114 can be dynamically and continuously improved by a supervised learning algorithm over the time. In some embodiments, the fraud detection component 106 may directly use the matrix (e.g., the individual score(s)) to generate a score indicating the fraudulent level of an account used by the technician computing device 120. In some embodiments, the fraud detection component 106 can use such an individual score or combine the individual scores that correspond to other account values of the matrix to generate the score for the technician computing device 120 (and/or the account it used).

The fraud detection component 106 can use the matrix to combine two or more individual scores to generate the score for the technician computing device 120 (and/or the account it used). The fraud detection component 106 can estimate an averaged value of the two or more individual scores as the score for the technician computing device 120 (and/or the account it used). The fraud detection component 106 can assign a weighting value for each of the two or more individual scores and generate the score for the technical computing device 120 (and/or the account it used) by combining the weighted individual scores.

The fraud detection component 106 can combine, integrate, or aggregate two or more account values into one account value to generate a score indicating a fraudulent level of the account used by the technician computing device 120 based on the hybrid account value. For example, in response to obtaining a geographic location and billing information (e.g., an account identifier) associated with the technician computing device 120, the fraud detection component 106 can obtain a hybrid account value as "account identifier 1234-5678-1234-5678 used in location A." The fraud detection component 106 can compare the hybrid account value with a list of hybrid account values for the technician computing device 120 (e.g., "account identifier 1234-5678-1234-5678 used in location B," "account identifier 1234-5678-1234-1234 used in location A") previously identified and dynamically managed by at least one of the endpoints. By communicating with at least one of the endpoints, if there is a full match (e.g., both components of the hybrid account value the fraud detection component 106 obtains match both components of the hybrid account values the end points manage), the fraud detection component 106 can assign a score to be substantially close to 0. If there is a partial match (e.g., one of the components of the hybrid account value the fraud detection component 106 obtains matches one of the components of the hybrid account values the end points manage), the fraud detection component 106 can assign a score to be substantially close to 0.5. If there is no match (e.g., none of the components of the hybrid account value the fraud detection component 106 obtains matches the components of the hybrid account values the end points manage), the fraud detection component 106 can assign a score to be substantially close to 0. The fraud detection component 106 can insert, update, or otherwise provide the score to a corresponding position of the matrix. In some embodiments, the fraud detection component 106 can use such a score as the score for the technician computing device 120 (and/or the account it used).

Thus, the fraud detection component 106 can use the matrix to generate a score for an account that the technician computing device 120 used to connect to the cloud service 130. The fraud detection component 106 can, in some cases, use the matrix to generate a score for an account that the receiver computing device 122 used to connect to the cloud service. For example, in response to obtaining a geographic location of the receiver computing device 122, the fraud detection component 106 can compare the location with a list of locations of the receiver computing device 122 previously identified and dynamically managed by at least one of the endpoints. By communicating with at least one of the endpoints, if there is a match, the fraud detection component 106 can assign an individual score to be substantially close to 0 for the receiver computing device 122 (and/or the account the receiver computing device 122 used) and for this particular account value. On the other hand, if there is no match, the fraud detection component 106 can assign an individual score to be substantially close to 1 for the receiver computing device 122 (and/or the account the receiver computing device 122 used) and this particular account value. The fraud detection component 106 can insert, update, or otherwise provide the individual score to a corresponding position of the matrix (e.g., an intersection of the receiver computing device 122 and geographic location of the receiver computing device 122). The fraud detection component 106 can use such an individual score or combine the individual scores that correspond to other account values of the matrix to generate the score for the receiver computing device 122 (and/or the account it used).

In response to generating a score for the technician computing device 120 or receiver computing device 122 (and/or the account it used), the fraud detection component 106 can compare the score with a fraud threshold. In the case of the score is estimated to range between 0 and 1, the fraud threshold can be set or predefined to 0.6 or 0.7, for example. The fraud threshold can be a static value, or relative value (e.g., percentage). The fraud detection component 106 can determine whether to terminate the connection, via which the technician computing device 120 or receiver computing device 122 intended to connect to the cloud service 130, based on the comparison. For example, if the fraud detection component 106 determining that the score is greater than or equal to the fraud threshold, the fraud detection component 106 can identify that the technician computing device 120 or receiver computing device 122 is a fraudulent computing device or used by a fraudulent account, and thus can terminate the connection. On the other hand, if the fraud detection component 106 determining that the score is less than the fraud threshold, the fraud detection component 106 can identify that the technician computing device 120 or receiver computing device 122 is not a fraudulent computing device or not used by a fraudulent account, and thus can permit the connection.

Simultaneously with or subsequently to terminating the connection, the fraud detection component 106 can communicate or interface with the ticket component 108 to generate a support ticket. Upon the generation of the support ticket, the ticket component 108 can use the interface 104 to communicate or interface with the ticketing system 150. In some embodiments, the ticketing system 150 can retrieve, store, or otherwise manage a number of support tickets. Each of the support tickets can be associated with a computing device or an account that has been identified as being fraudulent. In some embodiments, upon identifying a connection request to the cloud service 130 by a computing device, the fraud detection component 106 can communicate with ticketing system 150 to determine whether the computing device is a fraudulent computing device or used by a fraudulent account.

Figure 2:
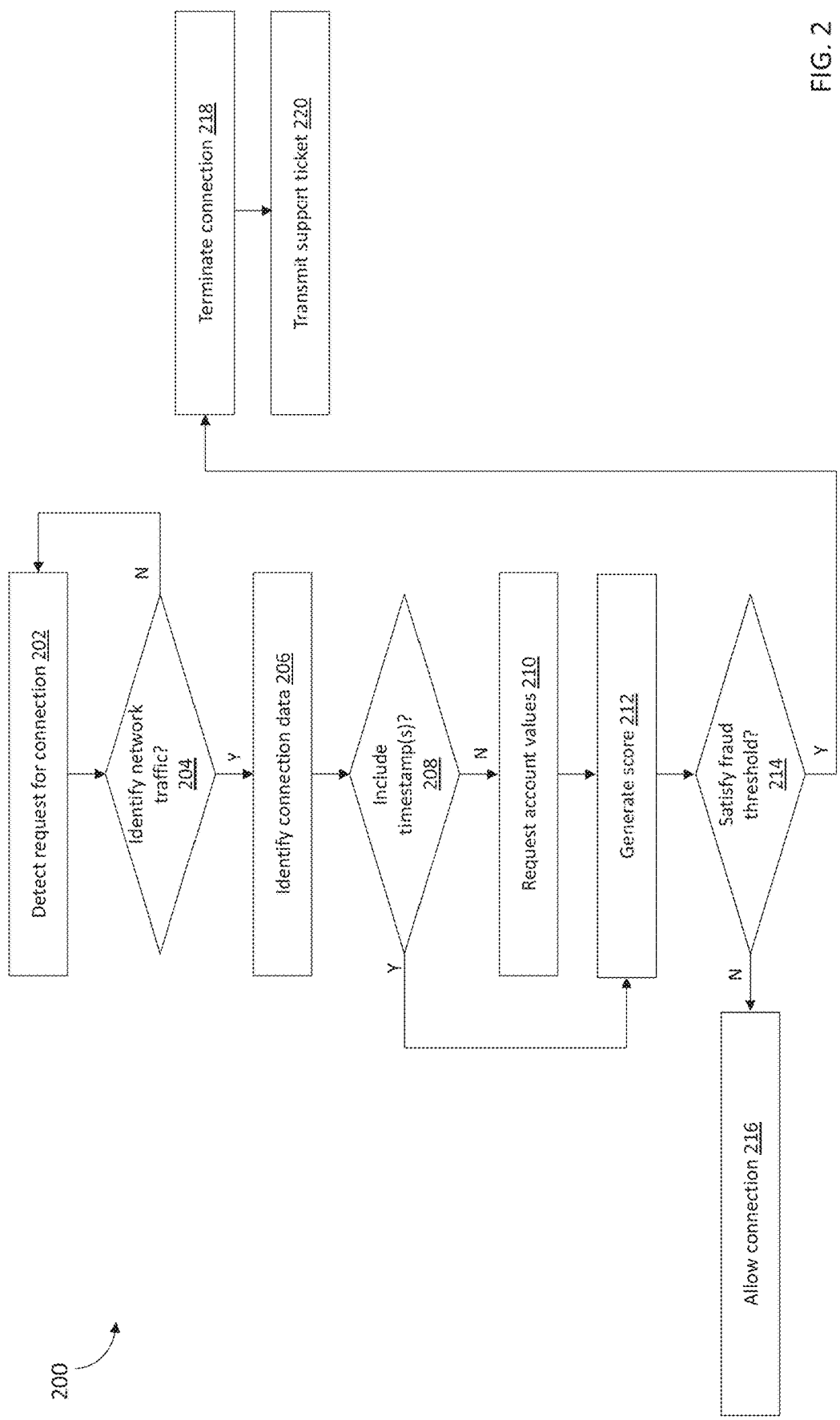
FIG. 2 is an illustrative block diagram of an example embodiment of a method for detecting fraudulent devices in information technology infrastructure.

Referring to FIG. 2, depicted is a flow diagram of one embodiment of a method 200 for detecting fraudulent computing devices in information technology infrastructure. The functionalities or operations of the method 200 can be implemented using, or performed by the components detailed herein in connection with FIG. 1, e.g., control system 102. In brief overview, a control system can detect a request for connection at operation 202. If the control system can identify network traffic at operation 204, the control system can identify connection data at operation 206. On the other hand, if the control system cannot identify network traffic at operation 204, the method 200 can proceed again to operation 202. At operation 208, the control system can determine whether the connection data includes timestamp(s). If not, the control system can request one or more account values at operation 210; and if so, the control system can generate a score at operation 212. At operation 214, the control system can determine whether the score satisfies a fraud threshold. If not, the control system can allow the connection at operation 216; and if so, the control system can terminate the connection at operation 218 and transmit a support ticket at operation 220.

Referring to operation 202, the control system can detect, pinpoint, or otherwise identify a request for a connection made by a technician computing device. The control system can be intermediary to one or more computing devices including the technician computing device and one or more servers that provide a cloud service. The technician computing device can make such a request through the one or more servers to access a receiver computing device.

Referring to operation 204, the control system can identify network traffic with a domain name service (DNS) request originated from or established by the technician computing device to determine whether the technician computing device has made a request to connect to the receiver computing device, or a connection between the technician computing device and receiver computing device has been established. The technician computing device 120 can send such a DNS request, which can include a query for a domain name, through a number of intermediary servers (e.g., a recursive resolver, a root server, etc.) to the one or more servers for using the cloud service to access the receiver computing device 122. Responsive to receiving the request, the one or more servers can respond to the technician computing device through at least one of the intermediary servers with an IP address matching the domain name in the query. The control system can identify the network traffic during any point of the above-described communication between the technician computing device and the one or more servers.

If at operation 204, the control system can identify the network traffic, the control system can identify connection data for the connection (operation 206). On the other hand, if at operation 204, the control system cannot identify the network traffic, the control system can continue detecting a request for connecting the technician computing device to the receiver computing device (operation 202).

Referring now to operation 206, the control system can extract, determine, or otherwise identify connection data for the connection via a data stream. The control system can identify connection data of the connection from a data stream. For example, the control system can identify the connection data, which can be at least one of: an IP address where the technician computing device logged into an account to the cloud service, an IP address where the technician computing device created the account to the cloud service, a timestamp (T1) when the technician computing device logged into the account to the cloud service, and a timestamp (T2) when the technician computing device created the account to the cloud service.

Next, at operation 208, the control system can determine whether the connection data includes one or more timestamps (e.g., T1 and/or T2). If the control system determines that no timestamp is included in the connection data, the control system can request one or more account values (operation 210). On the other hand, if the control system determines that one or more timestamps are included in the connection data, the control system can generate a score indicating a fraudulent level of the account based on the one or more timestamps (operation 212).

Referring to operation 210, the control system can request, retrieve, or obtain one or more account values. Each of the account values is associated with the account that the technician computing device used to establish the connection. The account value can include at least one of the following: billing information associated with the technician computing device, geographic locations of the technician computing device, types of the sessions to the one or more cloud services that the technician computing device intended to establish, and a number threshold of each session type that the technician computing device intended to establish.

Referring now to operation 212, if the connection data includes one or more of the above-mentioned timestamps, the control system can directly generate the score based on the one or more timestamps. In some embodiments, the control system can compare the timestamp from the connection data with one or more timestamps previously identified. The timestamp from the connection data can be associated with an operation performed by the technician computing device that is substantially similar to the operation associated with the previously identified timestamps. The control system can determine whether an offset between the timestamp identified from the connection data and the previously identified timestamps is greater than a predefined time threshold. If the offset is determined to be greater than or equal to the time threshold, the control system can generate a score indicating a relatively high fraudulent level (e.g., a score of 1); and if the offset is determined to be less than the time threshold, the control system can generate a score indicating a relatively low fraudulent level (e.g., a score of 0). For example, the control system can identify T1 (when a technician computing device logged into an account to access the cloud service) from connection data for a connection as 3 AM. The control system can determine that the T1 is different from one or more previously identified timestamps when the technician computing device normally logs into an account to access the cloud service by a time offset. Upon determining that the time offset is greater than a time threshold (e.g., 1 hour, 2 hours, 6 hours, etc.), the control system can generate a score indicating a relatively high fraudulent level of the account currently used by the technician computing device.

Referring still to operation 212, the control system can use a matrix to generate a score indicating a fraudulent level of the account based on each of the account values. The control system can generate the matrix using the account values. The control system can assign each of the account values an individual score to indicate a fraudulent level of the corresponding account value based on a data structure (e.g., a list, a table, a bitmap) managed by one or more of endpoints, for instance, an administrative account of the one or more cloud services. The individual score can be estimated to range from 0 to 1, where 1 indicates the highest fraudulent level and 0 indicates the lowest fraudulent level. The control system can collect the individual score of the account values across all the computing devices connected through the network over the time to generate the matrix. In some embodiments, the control system can use the matrix to combine two or more individual scores to generate the score. The control system can estimate an averaged value of the two or more individual scores as the score. The control system can assign a weighting value for each of the two or more individual scores and generate the score by combining the weighted individual scores. In some embodiments, the control system can combine two or more account values into one account value to generate the score.

Referring to operation 214, the control system can determine whether the score satisfies a fraud threshold. In some embodiments, if the control system determines that the score is greater than or equal to the fraud threshold, the control system can terminate the connection at operation 218. The control system can communicate with the one or more servers serving the cloud service to cease routing network traffic from and to the technician computing device, responsive to determining that the score is greater than or equal to the fraud threshold. The control system can directly block any network traffic from and to the technician computing device. Simultaneously with or subsequently to terminating the connection, the control system can transmit a support ticket to a ticketing system at operation 220. In some embodiments, the control system can generate the support ticket in response to determining that the score is greater than or equal to the fraud threshold. The control system can label the support ticket with the technician computing device (and/or the account it used).

On the other hand, if the control system determines that the score is less the fraud threshold, the control system can allow the connection at operation 216. As such, the technician computing device can use the connection to access the cloud service to continue or start with communicating with the receiver computing device to modify, update, or manage its configuration.

In an illustrative example, the control system can be configured with a Bernoulli Naïve Bayes Classifier to generate, construct and train the matrix in order to then identify whether a technician computing device is fraudulent. Features in a Bernoulli naive Bayes classifier can be binary such that they take only two values (e.g. a nominal categorical feature that has been one-hot encoded). The control system can create binary feature and target data. For example, X=np.random.randint(2, size=(100, 3)). The control system can create a binary target vector. For example, y=np.random.randint(2, size=(100, 1)).ravel( ). The vector "y" can be a vector of scalar 1's and 0's built via training, where 1=fraudulent technician computing device and 0=legitimate (or not fraudulent) technician computing device. The feature data can be represented as a matrix X. For example, X[0:10]=array([[1, 1, 1], [0, 1, 0], [1, 1, 1], [0, 0, 0], [1, 0, 1], [1, 1, 1], [0, 1, 1], [1, 1, 1], [1, 1, 1], [1, 1, 0]]). The matrix X can be an N by M matrix of calculated predictor values; N can be the number of times the model has been trained via supervised learning; M can be the number of predictors (e.g., "is the email domain free"). Each of the N rows can correspond to a single vector of predictor values. Each of the M columns can correspond to a particular predictor. The control system can train the Bernoulli Naive Bayes Classifier. The control system can create Bernoulli Naive Bayes object with prior probabilities of each class. For example, clf=BernoulliNB(class_prior=[0.25, 0.5]). The control system can train the model using, for example, model=clf.fit(X, y).

Figure 3A:
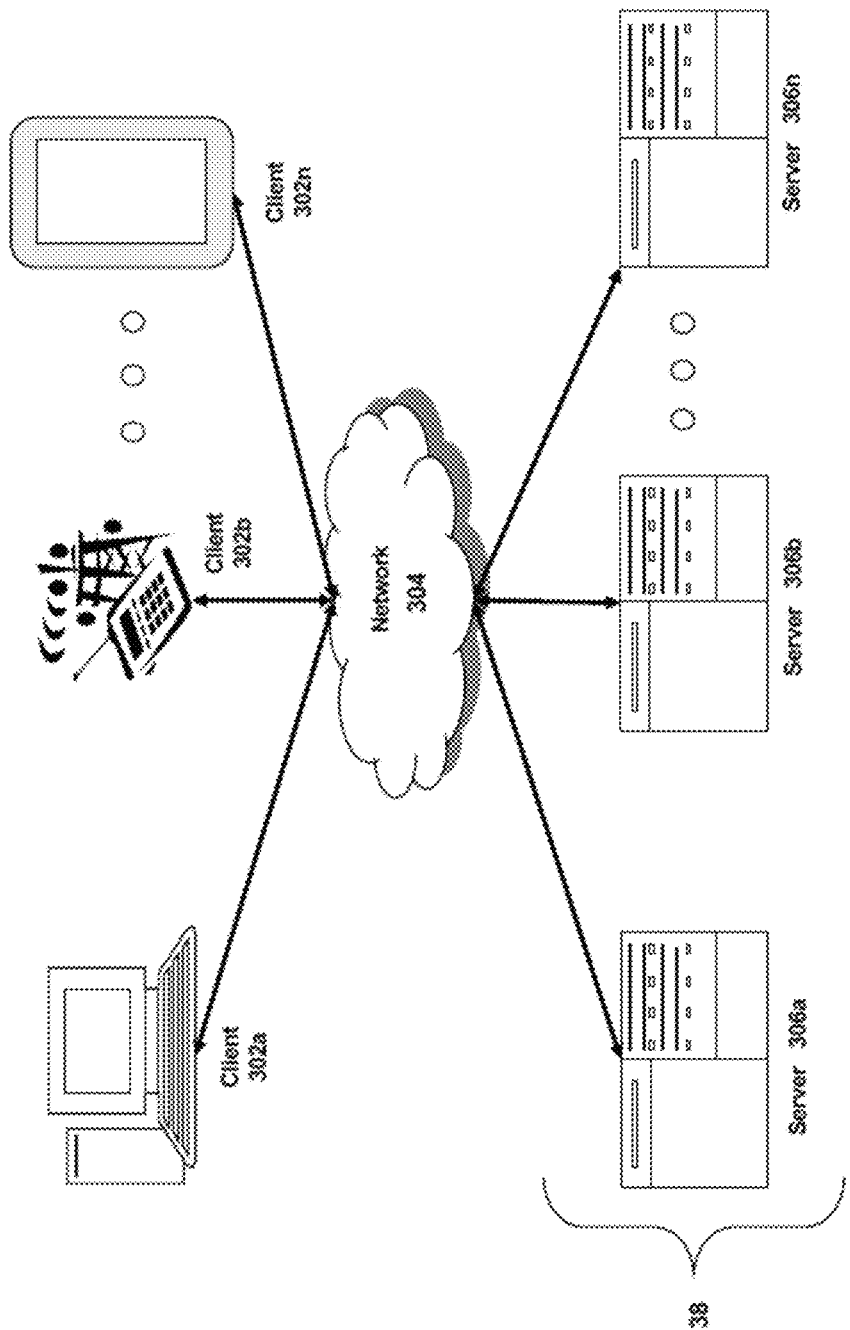
FIG. 3A is a block diagram depicting an embodiment of a network environment comprising client device in communication with server device.

Referring to FIG. 3A, an embodiment of a network environment that can be used in connection with the methods and systems described herein is depicted. In brief overview, the network environment includes one or more clients 302a-302n (also generally referred to as local machine(s) 302, client(s) 302, client node(s) 302, client machine(s) 302, client computer(s) 302, client device(s) 302, endpoint(s) 302, or endpoint node(s) 302) in communication with one or more servers 306a-306n (also generally referred to as server(s) 306, node 306, or remote machine(s) 306) via one or more networks 304. In some embodiments, a client 302 has the capacity to function as both a client node seeking access to resources provided by a server and as a server providing access to hosted resources for other clients 302a-302n.

Although FIG. 3A shows a network 304 between the clients 302 and the servers 306, the clients 302 and the servers 306 can be on the same network 304. In some embodiments, there are multiple networks 304 between the clients 302 and the servers 306. In one of these embodiments, a network 304' (not shown) can be a private network and a network 304 can be a public network. In another of these embodiments, a network 304 can be a private network and a network 304' a public network. In still another of these embodiments, networks 304 and 304' can both be private networks.

The network 304 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, or 4G. The network standards can qualify as one or more generation of mobile telecommunication standards by fulfilling a specification or standards such as the specifications maintained by International Telecommunication Union. The 3G standards, for example, can correspond to the International Mobile Telecommunications-2000 (IMT-2000) specification, and the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 304 can be any type and/or form of network. The geographical scope of the network 304 can vary widely and the network 304 can be a body area network (BAN), a personal area network (PAN), a local-area network (LAN), e.g. Intranet, a metropolitan area network (MAN), a wide area network (WAN), or the Internet. The topology of the network 304 can be of any form and can include, e.g., any of the following: point-to-point, bus, star, ring, mesh, or tree. The network 304 can be an overlay network which is virtual and sits on top of one or more layers of other networks 304'. The network 304 can be of any such network topology as known to those ordinarily skilled in the art capable of supporting the operations described herein. The network 304 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 304 can be a type of a broadcast network, a telecommunications network, a data communication network, or a computer network.

In some embodiments, the system can include multiple, logically-grouped servers 306. In one of these embodiments, the logical group of servers can be referred to as a server farm 38 or a machine farm 38. In another of these embodiments, the servers 306 can be geographically dispersed. In other embodiments, a machine farm 38 can be administered as a single entity. In still other embodiments, the machine farm 38 includes a plurality of machine farms 38. The servers 306 within each machine farm 38 can be heterogeneous—one or more of the servers 306 or machines 306 can operate according to one type of operating system platform (e.g., WINDOWS NT, manufactured by Microsoft Corp. of Redmond, Washington), while one or more of the other servers 306 can operate on according to another type of operating system platform (e.g., Unix, Linux, or Mac OS X).

In one embodiment, servers 306 in the machine farm 38 can be stored in high-density rack systems, along with associated storage systems, and located in an enterprise data center. In this embodiment, consolidating the servers 306 in this way can improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 38 do not need to be physically proximate to another server 306 in the same machine farm 38. Thus, the group of servers 306 logically grouped as a machine farm 38 can be interconnected using a wide-area network (WAN) connection or a metropolitan-area network (MAN) connection. For example, a machine farm 38 can include servers 306 physically located in different continents or different regions of a continent, country, state, city, campus, or room. Data transmission speeds between servers 306 in the machine farm 38 can be increased if the servers 306 are connected using a local-area network (LAN) connection or some form of direct connection. Additionally, a heterogeneous machine farm 38 can include one or more servers 306 operating according to a type of operating system, while one or more other servers 306 execute one or more types of hypervisors rather than operating systems. In these embodiments, hypervisors can be used to emulate virtual hardware, partition physical hardware, virtualize physical hardware, and execute virtual machines that provide access to computing environments, allowing multiple operating systems to run concurrently on a host computer. Native hypervisors can run directly on the host computer. Hypervisors can include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors can run within an operating system on a second software level. Examples of hosted hypervisors can include VMware Workstation and VIRTUALBOX.

Management of the machine farm 38 can be de-centralized. For example, one or more servers 306 can comprise components, subsystems and modules to support one or more management services for the machine farm 38. In one of these embodiments, one or more servers 306 provide functionality for management of dynamic data, including techniques for handling failover, data replication, and increasing the robustness of the machine farm 38. Each server 306 can communicate with a persistent store and, in some embodiments, with a dynamic store.

Server 306 can be a file server, application server, web server, proxy server, appliance, network appliance, gateway, gateway server, virtualization server, deployment server, SSL VPN server, or firewall. In one embodiment, the server 306 can be referred to as a remote machine or a node. In another embodiment, a plurality of nodes 290 can be in the path between any two communicating servers.

Figure 3B:
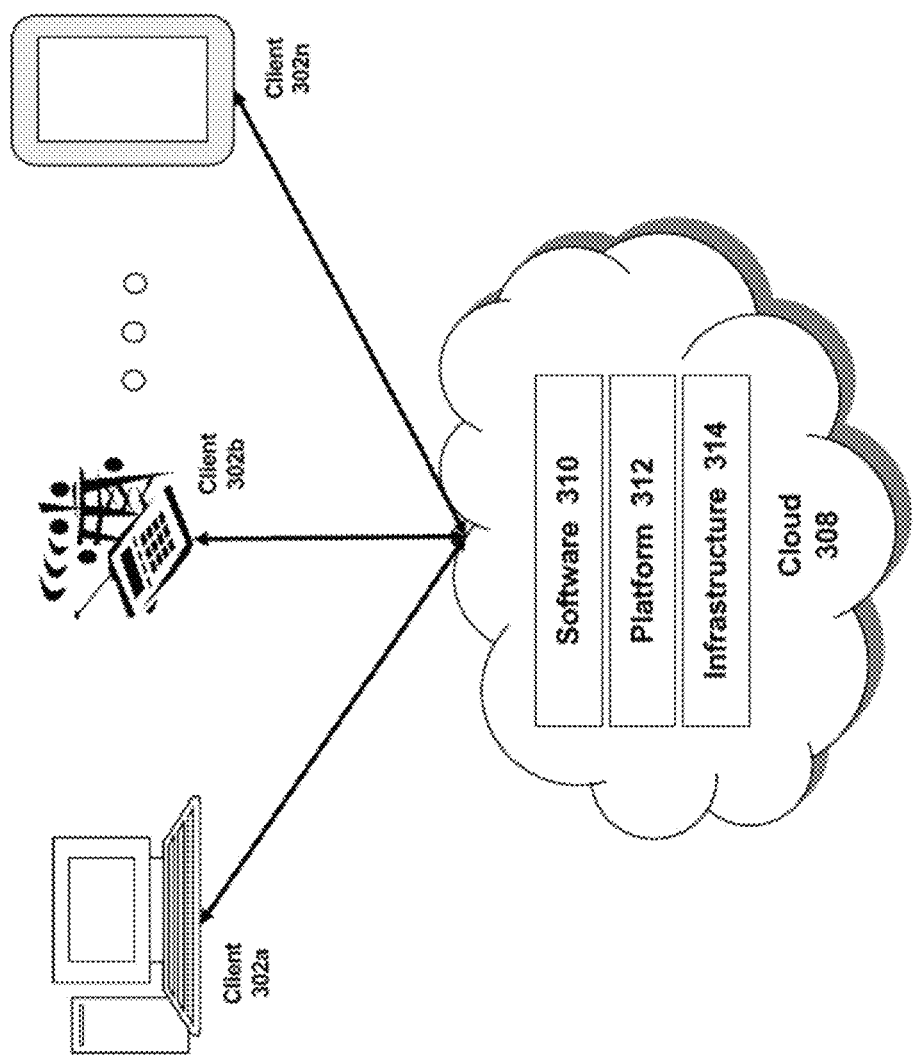
FIG. 3B is a block diagram depicting a cloud computing environment comprising client device in communication with cloud service providers.

Referring to FIG. 3B, a cloud computing environment is depicted. A cloud computing environment can provide client 302 with one or more resources provided by a network environment. The cloud computing environment can include one or more clients 302a-302n, in communication with a cloud 308 over one or more networks 304. Clients 302 can include, e.g., thick clients, thin clients, and zero clients. A thick client can provide at least some functionality even when disconnected from the cloud 308 or servers 306. A thin client or a zero client can depend on the connection to the cloud 308 or server 306 to provide functionality. A zero client can depend on the cloud 308 or other networks 304 or servers 306 to retrieve operating system data for the client device. The cloud 308 can include back end platforms, e.g., servers 306, storage, server farms or data centers.

The cloud 308 can be public, private, or hybrid. Public clouds can include public servers 306 that are maintained by third parties to the clients 302 or the owners of the clients. The servers 306 can be located off-site in remote geographical locations as disclosed above or otherwise. Public clouds can be connected to the servers 306 over a public network. Private clouds can include private servers 306 that are physically maintained by clients 302 or owners of clients. Private clouds can be connected to the servers 306 over a private network 304. Hybrid clouds 308 can include both the private and public networks 304 and servers 306.

The cloud 308 can also include a cloud based delivery, e.g. Software as a Service (SaaS) 310, Platform as a Service (PaaS) 314, and Infrastructure as a Service (IaaS) 614. IaaS can refer to a user renting the use of infrastructure resources that are needed during a specified time period. IaaS providers can offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers can offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers can offer the resources that PaaS provides, including storage, networking, servers, virtualization, operating system, middleware, or runtime resources. In some embodiments, SaaS providers can offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS can also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 302 can access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards can allow clients access to resources over HTTP, and can use Representational State Transfer (REST) protocol or Simple Object Access Protocol (SOAP). Clients 302 can access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that can be built on REST, HTTP, XML, or other protocols. Clients 302 can access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 302 can also access SaaS resources through smartphone or tablet applications, including, e.g., Salesforce Sales Cloud, or Google Drive app. Clients 302 can also access SaaS resources through the client operating system, including, e.g., Windows file system for DROPBOX.

In some embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

Figure 3C:
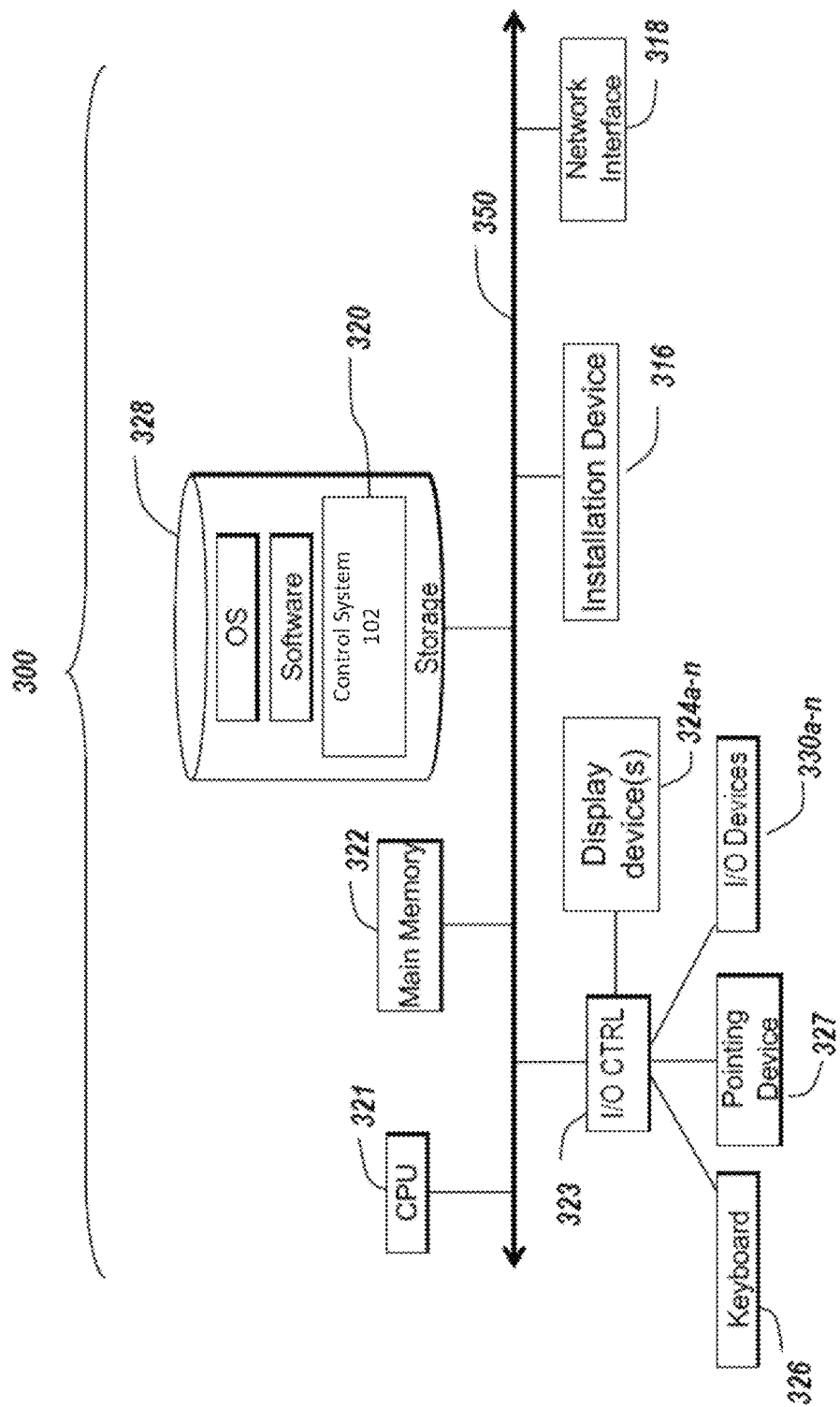
FIGS. 3C and 3D are block diagrams depicting embodiments of computing devices useful in connection with the methods and systems described herein.
Figure 3D:
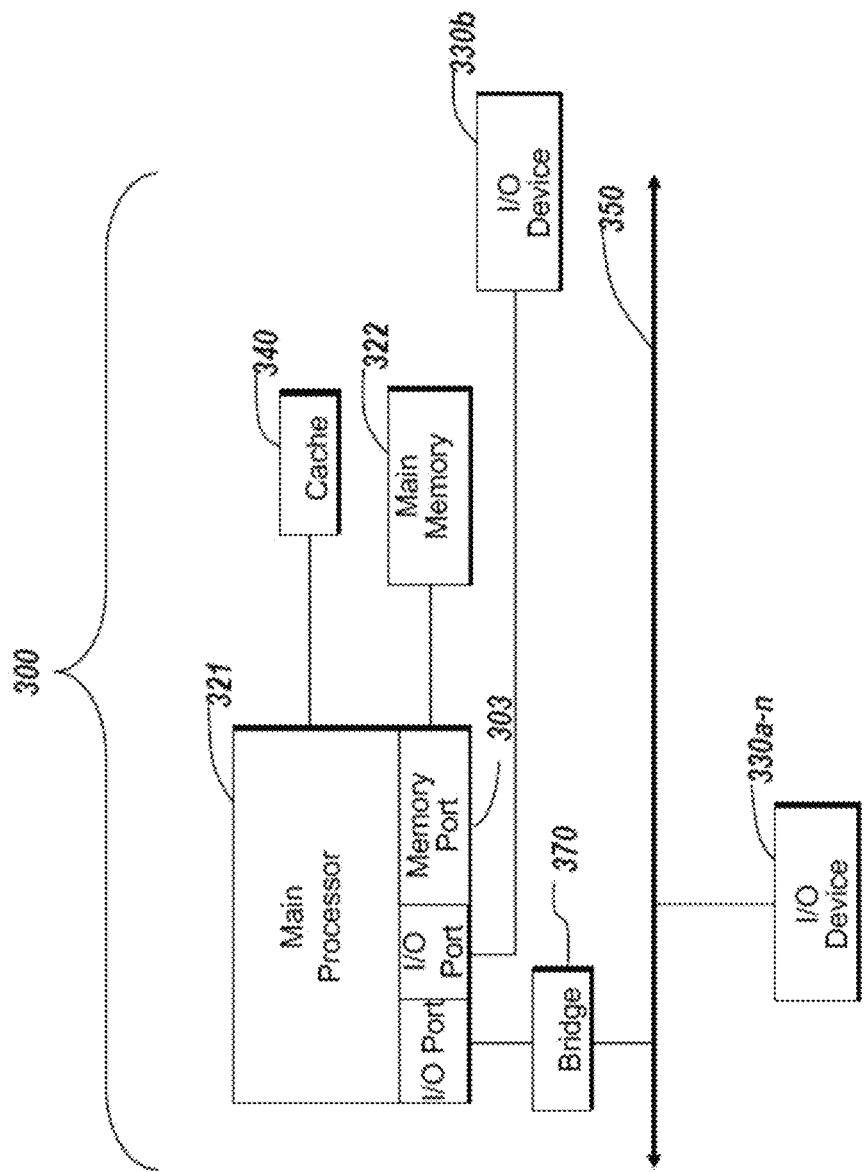

The client 302 and server 306 can be deployed as and/or executed on any type and form of computing device, e.g. a computer, network device or appliance capable of communicating on any type and form of network and performing the operations described herein. FIGS. 3C and 3D depict block diagrams of a computing device 300 useful for practicing an embodiment of the client 302 or a server 306. As shown in FIGS. 3C and 3D, each computing device 300 includes a central processing unit 321, and a main memory unit 322. As shown in FIG. 3C, a computing device 300 can include a storage device 328, an installation device 316, a network interface 318, an I/O controller 323, display devices 324a-324n, a keyboard 326 and a pointing device 327, e.g. a mouse. The storage device 328 can include, without limitation, an operating system, software, and a software of or associated with system 100. As shown in FIG. 3D, each computing device 300 can also include additional optional elements, e.g. a memory port 303, a bridge 370, one or more input/output devices 330a-330n (generally referred to using reference numeral 330), and a cache memory 640 in communication with the central processing unit 321.

The central processing unit 321 is any logic circuitry that responds to and processes instructions fetched from the main memory unit 322. In many embodiments, the central processing unit 321 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 300 can be based on any of these processors, or any other processor capable of operating as described herein. The central processing unit 321 can utilize instruction level parallelism, thread level parallelism, different levels of cache, and multi-core processors. A multi-core processor can include two or more processing units on a single computing component. Examples of a multi-core processors include the AMD PHENOM IIX2, INTEL CORE i5 and INTEL CORE i7.

Main memory unit 322 can include one or more memory chips capable of storing data and allowing any storage location to be directly accessed by the microprocessor 321. Main memory unit 322 can be volatile and faster than storage 328 memory. Main memory units 322 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 322 or the storage 328 can be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 322 can be based on any of the above described memory chips, or any other available memory chips capable of operating as described herein. In the embodiment shown in FIG. 3C, the processor 321 communicates with main memory 322 via a system bus 350 (described in more detail below). FIG. 3D depicts an embodiment of a computing device 300 in which the processor communicates directly with main memory 322 via a memory port 303. For example, in FIG. 3D the main memory 322 can be DRDRAM.

FIG. 3D depicts an embodiment in which the main processor 321 communicates directly with cache memory 640 via a secondary bus, sometimes referred to as a backside bus. In other embodiments, the main processor 321 communicates with cache memory 640 using the system bus 350. Cache memory 640 typically has a faster response time than main memory 322 and is typically provided by SRAM, BSRAM, or EDRAM. In the embodiment shown in FIG. 3D, the processor 321 communicates with various I/O devices 330 via a local system bus 350. Various buses can be used to connect the central processing unit 321 to any of the I/O devices 330, including a PCI bus, a PCI-X bus, or a PCI-Express bus, or a NuBus. For embodiments in which the I/O device is a video display 324, the processor 321 can use an Advanced Graphics Port (AGP) to communicate with the display 324 or the I/O controller 323 for the display 324. FIG. 3D depicts an embodiment of a computer 300 in which the main processor 321 communicates directly with I/O device 330b or other processors 321' via HYPERTRANSPORT, RAPIDIO, or INFINIB AND communications technology. FIG. 3D also depicts an embodiment in which local busses and direct communication are mixed: the processor 321 communicates with I/O device 330a using a local interconnect bus while communicating with I/O device 330b directly.

A wide variety of I/O devices 330a-330n can be present in the computing device 300. Input devices can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices can include video displays, graphical displays, speakers, headphones, inkjet printers, laser printers, and 3D printers.

Devices 330a-330n can include a combination of multiple input or output devices, including, e.g., Microsoft KINECT, Nintendo Wiimote for the WII, Nintendo WII U GAMEPAD, or Apple IPHONE. Some devices 330a-330n allow gesture recognition inputs through combining some of the inputs and outputs. Some devices 330a-330n provides for facial recognition which can be utilized as an input for different purposes including authentication and other commands. Some devices 330a-330n provides for voice recognition and inputs, including, e.g., Microsoft KINECT, SIRI for IPHONE by Apple, Google Now or Google Voice Search.

Additional devices 330a-330n have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 330a-330n, display devices 324a-324n or group of devices can be augment reality devices. The I/O devices can be controlled by an I/O controller 323 as shown in FIG. 3C. The I/O controller can control one or more I/O devices, such as, e.g., a keyboard 326 and a pointing device 327, e.g., a mouse or optical pen. Furthermore, an I/O device can also provide storage and/or an installation medium 316 for the computing device 300. In still other embodiments, the computing device 300 can provide USB connections (not shown) to receive handheld USB storage devices. In further embodiments, an I/O device 330 can be a bridge between the system bus 350 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 324a-324n can be connected to I/O controller 323. Display devices can include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays can use, e.g. stereoscopy, polarization filters, active shutters, or autostereoscopy. Display devices 324a-324n can also be a head-mounted display (HMD). In some embodiments, display devices 324a-324n or the corresponding I/O controllers 323 can be controlled through or have hardware support for OPENGL or DIRECTX API or other graphics libraries.

In some embodiments, the computing device 300 can include or connect to multiple display devices 324a-324n, which each can be of the same or different type and/or form. As such, any of the I/O devices 330a-330n and/or the I/O controller 323 can include any type and/or form of suitable hardware, software, or combination of hardware and software to support, enable or provide for the connection and use of multiple display devices 324a-324n by the computing device 300. For example, the computing device 300 can include any type and/or form of video adapter, video card, driver, and/or library to interface, communicate, connect or otherwise use the display devices 324a-324n. In one embodiment, a video adapter can include multiple connectors to interface to multiple display devices 324a-324n. In other embodiments, the computing device 300 can include multiple video adapters, with each video adapter connected to one or more of the display devices 324a-324n. In some embodiments, any portion of the operating system of the computing device 300 can be configured for using multiple displays 324a-324n. In other embodiments, one or more of the display devices 324a-324n can be provided by one or more other computing devices 300a or 300b connected to the computing device 300, via the network 304. In some embodiments software can be designed and constructed to use another computer's display device as a second display device 324a for the computing device 300. For example, in one embodiment, an Apple iPad can connect to a computing device 300 and use the display of the device 300 as an additional display screen that can be used as an extended desktop. One ordinarily skilled in the art will recognize and appreciate the various ways and embodiments that a computing device 300 can be configured to have multiple display devices 324a-324n.

Referring again to FIG. 3C, the computing device 300 can comprise a storage device 328 (e.g. one or more hard disk drives or redundant arrays of independent disks) for storing an operating system or other related software, and for storing application software programs such as any program related to the software 320 for the experiment tracker system. Examples of storage device 328 include, e.g., hard disk drive (HDD); optical drive including CD drive, DVD drive, or BLU-RAY drive; solid-state drive (SSD); USB flash drive; or any other device suitable for storing data. Some storage devices can include multiple volatile and non-volatile memories, including, e.g., solid state hybrid drives that combine hard disks with solid state cache. Some storage device 328 can be non-volatile, mutable, or read-only. Some storage device 328 can be internal and connect to the computing device 300 via a bus 350. Some storage device 328 can be external and connect to the computing device 300 via a I/O device 330 that provides an external bus. Some storage device 328 can connect to the computing device 300 via the network interface 318 over a network 304, including, e.g., the Remote Disk for MACBOOK AIR by Apple. Some client devices 302 can not require a non-volatile storage device 328 and can be thin clients or zero clients 302. Some storage device 328 can also be used as a installation device 316, and can be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 302 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on a client device 302. An application distribution platform can include a repository of applications on a server 306 or a cloud 308, which the clients 302a-302n can access over a network 304. An application distribution platform can include application developed and provided by various developers. A user of a client device 302 can select, purchase and/or download an application via the application distribution platform.

Furthermore, the computing device 300 can include a network interface 318 to interface to the network 304 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 300 communicates with other computing devices 300' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 318 can comprise a built-in network adapter, network interface card, PCMCIA network card, EXPRESSCARD network card, card bus network adapter, wireless network adapter, USB network adapter, modem or any other device suitable for interfacing the computing device 300 to any type of network capable of communication and performing the operations described herein.

A computing device 300 of the sort depicted in FIGS. 3B and 3C can operate under the control of an operating system, which controls scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, can be used on zero clients or thin clients, including, e.g., CHROMEBOOKS.

The computer system 300 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 300 has sufficient processor power and memory capacity to perform the operations described herein. In some embodiments, the computing device 300 can have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 300 is a gaming system. For example, the computer system 300 can comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 300 is a digital audio player such as the Apple IPOD, IPOD Touch, and IPOD NANO lines of devices, manufactured by Apple Computer of Cupertino, California. Some digital audio players can have other functionality, including, e.g., a gaming system or any functionality made available by an application from a digital application distribution platform. For example, the IPOD Touch can access the Apple App Store. In some embodiments, the computing device 300 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 300 is a tablet e.g. the IPAD line of devices by Apple; GALAXY TAB family of devices by Samsung; or KINDLE FIRE, by Amazon.com, Inc. of Seattle, Washington. In other embodiments, the computing device 300 is a eBook reader, e.g. the KINDLE family of devices by Amazon.com, or NOOK family of devices by Barnes & Noble, Inc. of New York City, New York.

In some embodiments, the client device 302 (or communications device) includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the client device 302 is a laptop or desktop computer equipped with a web browser and a microphone and speaker system, e.g. a telephony headset. In these embodiments, the communications devices 302 are web-enabled and can receive and initiate phone calls. In some embodiments, a laptop or desktop computer is also equipped with a webcam or other video capture device that enables video chat and video call.

In some embodiments, the status of one or more machines 302, 306 in the network 304 can be monitored as part of network management. In one of these embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above can provide multiple ones of any or each of those components and these components can be provided on either a standalone machine or, in some embodiments, on multiple machines in a distributed system. The systems and methods described above can be implemented as a method, apparatus or article of manufacture using programming and/or engineering techniques to produce software, firmware, hardware, or any combination thereof. In addition, the systems and methods described above can be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture can be accessible from a file server providing access to the computer-readable programs via a network transmission line, wireless transmission media, signals propagating through space, radio waves, infrared signals, etc. The article of manufacture can be a flash memory card or a magnetic tape. The article of manufacture includes hardware logic as well as software or programmable code embedded in a computer readable medium that is executed by a processor. The computer-readable programs can be implemented in a programming language, such as LISP, PERL, C, C++, C #, PROLOG, or in any byte code language such as JAVA. The software programs can be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can be integrated in a single software product or packaged into multiple software products.

References to "or" can be construed as inclusive so that any terms described using "or" can indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures can be performed in any order. In certain embodiments, multitasking and parallel processing can be advantageous.

While this specification contains many specific implementation details, these should not be construed as limitations on the scope of any subject matter of what can be claimed, but rather as descriptions of features specific to particular implementations of the subject matter. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

What is claimed is:

1. A method of managing fraudulent devices, comprising:
loading, by a control system, a classification model configured to generate fraud scores based on account values provided as input, the classification model trained using a training dataset comprising respective account values of a plurality of technician computing devices identified in a plurality of past connections to a plurality of receiver computing devices via a cloud service, the training dataset identifying a subset of the plurality of past connections as fraudulent;
detecting, by the control system, a request to communicatively couple a technician computing device with a receiver computing device, the technician computing device associated with an account; and
generating, by the control system, a fraud score for the account by providing input based on a plurality of account values of the account to the classification model.

2. The method of claim 1, wherein the classification model is trained using supervised learning.

3. The method of claim 1, wherein the classification model comprises one of a Bernoulli Naïve Bayes classifier, a logistic regression model, or a decision tree model.

4. The method of claim 1, further comprising:
terminating, by the control system, a connection between the technician computing device and the receiver computing device responsive to the fraud score exceeding a fraud threshold.

5. The method of claim 4, further comprising:
transmitting, by the control system, to a ticketing system, a support ticket generated responsive to the fraud score exceeding the fraud threshold.

6. The method of claim 1, wherein the training dataset further comprises respective connection data for each of the plurality of past connections.

7. The method of claim 6, wherein the connection data comprises at least one of an IP address of a first computing device corresponding to a respective connection, a first timestamp corresponding to a request to create the respective connection, and a second timestamp corresponding to a request to create a respective account identified in the respective connection.

8. The method of claim 1, wherein the respective account values of each of the plurality of technician computing devices comprises a respective geographical location.

9. The method of claim 1, wherein the training dataset further comprises a respective session type of each of the plurality of past connections.

10. The method of claim 1, further comprising:
determining, by the control system, that a second connection between a second technician computing device and a second receiver computing device is fraudulent; and
updating, by the control system, the classification model based on respective second account values associated with the second technician computing device.

11. A system for managing fraudulent devices, comprising:
a control system comprising one or more processors and memory, the one or more processors receiving instructions from the memory to cause the control system to
load a classification model configured to generate fraud scores based on account values provided as input, the classification model trained using a training dataset comprising respective account values of a plurality of technician computing devices identified in a plurality of past connections to a plurality of receiving computing devices via a cloud service, the training dataset identifying a subset of the plurality of past connections as fraudulent;
detect a request to communicatively couple a technician computing device with a receiver computing device, the technician computing device associated with an account; and
generate a fraud score for the account by providing input based on a plurality of account values of the account to the classification model.

12. The system of claim 11, wherein the classification model is trained using supervised learning.

13. The system of claim 11, wherein the classification model comprises one of a Bernoulli Naïve Bayes classifier, a logistic regression model, or a decision tree model.

14. The system of claim 11, wherein the instructions further cause the control system to:
terminate a connection between the technician computing device and the receiver computing device responsive to the fraud score exceeding a fraud threshold.

15. The system of claim 14, wherein the instructions further cause the control system to:
transmit, to a ticketing system, a support ticket generated responsive to the fraud score exceeding the fraud threshold.

16. The system of claim 11, wherein the training dataset further comprises respective connection data for each of the plurality of past connections.

17. The system of claim 16, wherein the connection data comprises at least one of an IP address of a first computing device corresponding to a respective connection, a first timestamp corresponding to a request to create the respective connection, and a second timestamp corresponding to a request to create a respective account identified in the respective connection.

18. The system of claim 11, wherein the respective account values of each of the plurality of technician computing devices comprises a respective geographical location.

19. The system of claim 11, wherein the training dataset further comprises a respective session type of each of the plurality of past connections.

20. The system of claim 11, wherein the instructions further cause the control system to:
determine that a second connection between a second technician computing device and a second receiver computing device is fraudulent; and
update the classification model based on respective second account values associated with the second technician computing device.

* * * * *